US007942995B2

(12) United States Patent
Evans, Jr. et al.

(10) Patent No.: US 7,942,995 B2
(45) Date of Patent: May 17, 2011

(54) METHOD FOR CONVERTING A MULTI-PLY PAPER PRODUCT

(75) Inventors: David George Evans, Jr., Tunkhannock, PA (US); George Vincent Wegele, Mason, OH (US)

(73) Assignee: The Procter & Gamble Company, Cincinnati, OH (US)

(*) Notice: Subject to any disclaimer, the term of this patent is extended or adjusted under 35 U.S.C. 154(b) by 302 days.

(21) Appl. No.: 11/899,230

(22) Filed: Sep. 5, 2007

(65) Prior Publication Data

US 2009/0056860 A1 Mar. 5, 2009

(51) Int. Cl.
*B31F 1/07* (2006.01)
*B29C 59/04* (2006.01)

(52) U.S. Cl. .......... 156/209

(58) Field of Classification Search .......... 156/209, 156/214

See application file for complete search history.

(56) References Cited

U.S. PATENT DOCUMENTS

| | | | | |
|---|---|---|---|---|
| 3,611,919 | A | 10/1971 | Thomas | |
| 3,708,366 | A | 1/1973 | Donnelly | |
| 4,110,152 | A | 8/1978 | Dunning et al. | |
| 4,325,768 | A * | 4/1982 | Schulz | 156/206 |
| 4,422,892 | A * | 12/1983 | Plant | 156/209 |
| 4,483,728 | A * | 11/1984 | Bauernfeind | 156/209 |
| 4,978,565 | A | 12/1990 | Pigneul et al. | |
| 5,779,965 | A | 7/1998 | Beuther et al. | |
| 5,897,930 | A | 4/1999 | Calhoun et al. | |
| 6,030,690 | A * | 2/2000 | McNeil et al. | 428/156 |
| 6,193,918 | B1 | 2/2001 | McGuire et al. | |
| 6,383,958 | B1 | 5/2002 | Swanson et al. | |
| 6,579,594 | B2 * | 6/2003 | Wendler, Jr. | 428/172 |
| 6,602,454 | B2 | 8/2003 | McGuire et al. | |
| 6,723,203 | B2 | 4/2004 | Roussel et al. | |
| 6,773,647 | B2 | 8/2004 | McGuire et al. | |
| 6,863,107 | B2 * | 3/2005 | Hein et al. | 156/470 |
| 6,881,471 | B2 | 4/2005 | Toussant et al. | |
| 6,916,403 | B2 | 7/2005 | Basler et al. | |
| 7,029,546 | B2 | 4/2006 | Basler et al. | |

(Continued)

FOREIGN PATENT DOCUMENTS

WO WO 2005077649 A1 * 8/2005

OTHER PUBLICATIONS

U.S. Appl. No. 11/899,231, filed Sep. 5, 2007, Wegele. U.S. Appl. No. 11/899,225, filed Sep. 5, 2007, Wegele.
U.S. Appl. No. 11/899,229, filed Sep. 5, 2007, Evans, Jr.; Weigele.

*Primary Examiner* — John L. Goff
*Assistant Examiner* — Barbara J. Musser
(74) *Attorney, Agent, or Firm* — Peter D. Meyer

(57) ABSTRACT

A process for manufacturing a multi-ply web material is disclosed. The process has the steps of: providing an embossing roll having first, second, and third nips disposed about a periphery thereof; providing a first web material; embossing the first web material in the first nip to produce an embossed first web material having embossed portions associated therewith; applying an adhesive to at least some of the embossed portions of the embossed first web material; joining the embossed first web material to a second web material in a face-to-face relationship in the second nip so that the embossed portions of the embossed first web material are contactingly engaged with corresponding portions of the second web material; and, embossing both the embossed first web material and the second web material in the third nip to produce the embossed multi-ply web material.

18 Claims, 5 Drawing Sheets

U.S. PATENT DOCUMENTS

| | | | |
|---|---|---|---|
| 7,063,766 | B2 | 6/2006 | Saarvali et al. |
| 7,118,796 | B2 | 10/2006 | Schulz et al. |
| 2002/0079073 | A1 * | 6/2002 | Wilhelm ........................ 162/109 |
| 2002/0125606 | A1 | 9/2002 | McGuire et al. |
| 2002/0171168 | A1 | 11/2002 | McGuire et al. |
| 2003/0198788 | A1 | 10/2003 | Andersson |
| 2006/0037691 | A1 | 2/2006 | Haskett et al. |
| 2006/0138693 | A1 | 6/2006 | Tuman et al. |
| 2006/0278355 | A1 | 12/2006 | Boatman et al. |

* cited by examiner

METHOD FOR CONVERTING A MULTI-PLY PAPER PRODUCT

FIELD OF THE INVENTION

The present invention relates to processes and equipment for embossing and applying adhesive to paper webs and laminating two or more paper webs together.

BACKGROUND OF THE INVENTION

Paper webs made from cellulosic fibers are used in consumer products such as paper towels, toilet tissue, and facial tissue. Multi-ply paper structures are well known in the art. It is generally understood that a multi-ply structure can have an absorbent capacity greater than the sum of the absorbent capacities of the individual single plies which make up the multi-ply structure. Without wishing to be limited by theory, it is thought that this difference is due, at least in part, to the inter-ply storage space created by the addition of an extra ply.

Multi-ply paper products may have two or more plies positioned in face to face relationship and joined together. Each ply can be formed from a paper web. A paper web can have one or more layers as it is formed on a paper machine, as is also well known in the art.

Papermaking is generally understood to be a process in which paper is produced into large rolls, and wherein the large rolls are converted. Paper converting may be described as a processing step in which paper is used to fabricate another paper product. For example, paper converting may include operations such as embossing, slitting, sheeting, grooving, punching, and folding. Some converting operations may also include perforating, blocking, binding, gluing, and laminating as well.

For example, converting may include the embossing and marrying of two or more plies to form a multi-ply paper structure. The individual plies of a multi-ply paper structure may be joined in any number of suitable ways, including adhesive bonding or mechanical bonding, such as by embossing. Frequently, plies are embossed for aesthetic reasons, to provide space between adjacent plies, and to connect adjacent plies in face to face relationship.

Embossing is typically performed by one of three processes, knob-to-knob embossing, nested embossing, and/or rubber-to-steel embossing. Knob-to-knob embossing comprises axially parallel rolls juxtaposed to form a nip between the crests of the embossing knobs on opposing rolls. Nested embossing comprises axially parallel rolls juxtaposed to form a nip where the embossing knobs on one roll mesh between the embossing knobs of the other roll. Rubber-to-steel embossing comprises a steel roll with embossing knobs opposed to a roll having an elastomeric roll cover wherein the two rolls are axially parallel and juxtaposed to form a nip where the embossing knobs of the embossing roll mesh with the elastomeric roll cover of the opposing roll.

For example, during the knob-to-knob embossing process of a two-ply paper web, each paper web is fed through separate nips formed between separate embossing rolls and pressure rolls where embossing knobs on the embossing rolls produce compressed regions in each paper web. The two paper webs are then fed through a common nip formed between the embossing rolls where the embossing knobs on the two rolls bring the paper webs together in a face-to-face contacting relationship.

By comparison, nested embossing works by having the crests of the embossing knobs on one embossing roll intermesh with the embossing knobs on the opposing embossing roll at the nip formed between the two rolls. As a paper web is passed between the two embossing rolls, a pattern is produced on the surface of the paper web by the interconnectivity of the knobs of one roll with the open spaces of the opposing roll.

Comparatively, rubber-to-steel embossing works by having one hard embossing roll having embossing knobs in a desired pattern and a back-side soft impression roll, often having an elastomeric roll cover aligned in an axially parallel configuration to form a nip between the rolls. As a paper web is passed through the nip between the rolls, the embossing knobs impress the web against and into the rubber to deform the structure of the web.

It is possible to marry two or more paper webs together using adhesive. In an exemplary nested embossing process, an adhesive applicator roll may be aligned in an axially parallel arrangement with one of the two embossing rolls forming a nip therewith, such that the adhesive applicator roll is upstream of the nip formed between the two embossing rolls. The adhesive applicator roll transfers adhesive to the embossed paper web on the embossing roll at the crests of the embossing knobs. The crests of the embossing knobs typically do not touch the perimeter of the opposing roll at the nip formed therebetween necessitating the addition of a marrying roll to apply pressure for lamination. The marrying roll forms a nip with the same embossing roll forming the nip with the adhesive applicator roll, downstream of the nip formed between the two embossing rolls.

It is also known in the art to marry two or more paper webs autogenously (without adhesives) by high pressure lamination. With high pressure lamination, the adhesive applicator roll is eliminated and, in some embodiments, the marrying roll may be replaced with a steel anvil roll. In addition to bonding the paper webs, high pressure lamination produces a visually distinctive embossment pattern exhibiting a glassine appearance which is decoratively pleasing.

Despite the variety of embossing/marrying techniques that are known in the prior art, a common problem that occurs when producing an embossed, multi-ply paper product is the mis-registration that may occur during the converting processes. For example, in the nested embossing processes of the prior art, the transformations of embossing, adhesive application and marrying (laminating one ply to another ply) ideally occur in the same localized area. In a product where embossing, adhesive application, and/or marrying do not occur in the same localized area, the product may suffer from a relatively low ply-bond strength, less-pronounced embossments, or double embossments—a result of an emboss roll and marrying roll not striking the paper in the same area.

Without wishing to be limited by theory, it is thought that one possible cause of misregistration of plies in prior art processes/using prior art apparatus is the loss of tension in a paper web that may occur during embossing which may be magnified by the high interactive forces between the adhesive and the paper web. In this scenario, it may be possible for a paper web with a relatively low tension to "lift off" and go out of phase with the ply with which it is to be laminated because of interactions that the paper web may have with the adhesive applicator roll. As a result of the loss of tension/"lift off", the paper web may lose tension and consequently may slip out of position, thus causing the resultant embossed multi-ply product to be misregistered.

Thus it is desirable to provide an apparatus and process for manufacturing a multi-ply paper product wherein the apparatus and process provides improved registration control such that a paper substrate having adhesive applied thereon is able to maintain registration of the aforementioned during an embossing process. The present invention overcomes the limitations of the prior art by providing increased stability to the paper substrates during the embossing and marrying transformations in order to reduce, and in some cases, eliminate misregistration between plies.

SUMMARY OF THE INVENTION

In one embodiment, the present invention is directed to a process for manufacturing a multi-ply paper product, the process comprising the steps of: providing a first paper web; providing a second paper web; and providing an apparatus. The apparatus comprises: a first pressure roll; an embossing roll; a marrying roll; and a second pressure roll. The embossing roll comprises a plurality of embossing protrusions wherein each embossing protrusion has a distal end. The first pressure roll and the embossing roll are juxtaposed in an axially parallel relationship to form a first nip therebetween. The first nip has a first nip width. The first pressure roll and the embossing roll are adapted to receive a first paper web at the first nip. The adhesive application roll and the embossing roll are juxtaposed in an axially parallel relationship to form a gap therebetween. The adhesive application roll and the embossing roll are adapted to receive the first paper web, after the first paper web has traversed the first nip, at the gap. The marrying roll is juxtaposed in an axially parallel relationship with the embossing roll to form a third nip therebetween. The marrying roll and embossing roll are adapted to receive the first paper web and a second paper web, after the first paper web has traversed the gap, and marry the first paper web to the second paper web at the third nip. The second pressure roll and the embossing roll are juxtaposed in an axially parallel relationship to form a second nip therebetween, wherein the second nip has a second nip width, and wherein the second pressure roll and embossing roll are adapted to receive the first paper web and the second paper web, after the first paper web and the second paper web have traversed the third nip, at the second nip. The process further comprises the steps of: forwarding the first paper web through the first nip such that portions of the first paper web are embossed at the first nip to provide an embossed first paper web; forwarding the embossed first paper web through the gap such that the embossed portions of the first paper web receive adhesive from the adhesive application roll to provide an adhesively provided first paper web; forwarding the adhesively provided first paper web and the second paper web through the third nip such that the embossed, adhesively provided portions of the first paper web are married to portions of the second paper web to form a multi-ply paper product; and forwarding the multi-ply paper product through the second nip such that portions of the multi-ply paper product are embossed to provide an embossed multi-ply paper product.

In another embodiment, the present invention is directed to a process for providing a multi-ply embossed paper product comprising the steps of: providing a first paper web; providing a second paper web; providing an apparatus. The apparatus comprises: a first pressure roll; an embossing roll; a marrying roll; and a second pressure roll. The embossing roll comprises a plurality of embossing protrusions wherein each embossing protrusion comprises a distal end. The first pressure roll and the embossing roll are juxtaposed in an axially parallel relationship to form a first nip therebetween. The first nip has a first nip width. The first pressure roll and the embossing roll are adapted to receive a first paper web at the first nip. The marrying roll is juxtaposed in an axially parallel relationship with the embossing roll such that the marrying roll and embossing roll are adapted to receive the first paper web and a second paper web and provide a marrying force of greater than 100 pli after the first paper web has traversed the first nip, and marry the first paper web to the second paper web. The second pressure roll and the embossing roll are juxtaposed in an axially parallel relationship to form a second nip therebetween. The second nip has a second nip width. The second pressure roll and embossing roll are adapted to receive the first paper web and the second paper web, after the first paper web and the second paper web have traversed the marrying roll. The process further comprises the steps of: forwarding the first paper web through the first nip such that portions of the first paper web are embossed at the first nip to provide an embossed first paper web; forwarding the embossed first paper web and the second paper web through the embossing roll and marrying roll such that the embossed, adhesively provided portions of the first paper web are married to portions of the second paper web to form a multi-ply paper product; and forwarding the multi-ply paper product through the second nip such that portions of the multi-ply paper product are embossed to provide an embossed multi-ply paper product.

BRIEF DESCRIPTION OF THE DRAWINGS

While the specification concludes with claims that particularly point out and distinctly claim the present invention, it is believed that the present invention will be understood better from the following description of embodiments, taken in conjunction with the accompanying drawings, in which like reference numerals identify identical elements.

Without intending to limit the invention, embodiments are described in more detail below.

DETAILED DESCRIPTION OF THE INVENTION

Definitions

Figure 1A:
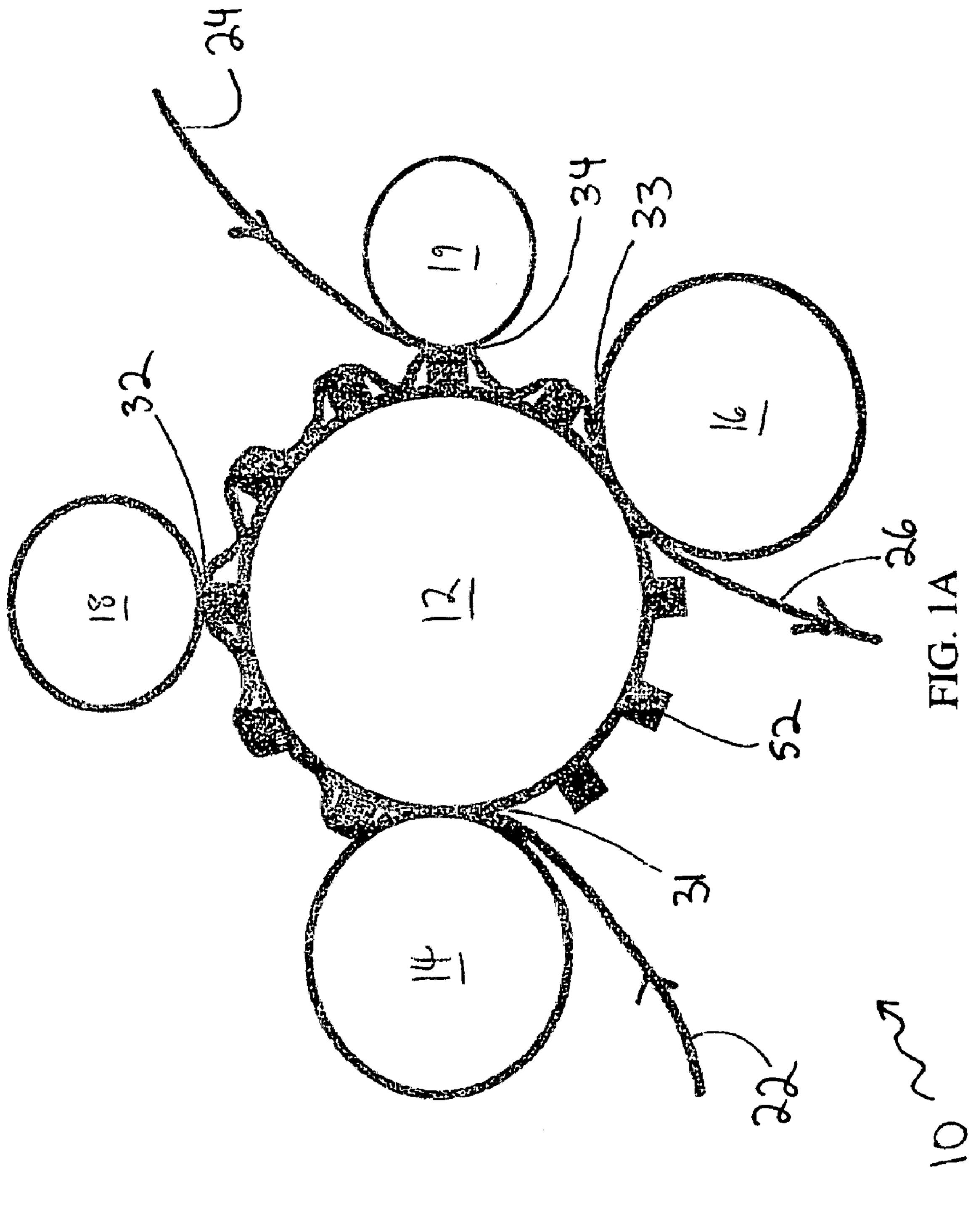
FIG. 1A is a schematic side view of an exemplary embodiment of an apparatus of the present invention.

As used herein, "misregistration", refers to mis-indexing that may occur during the embossing, adhesive application and/or marrying transformations. Misregistration may be measured by gauging the level of indexing that occurs between a selected feature, or other marker, on the surface of a paper web. Misregistration may occur either before, or after, the application of adhesive to the paper web. Without wishing to be limited by theory, it is thought that a misregistration may occur because of the high level of interactive forces between the paper web and adhesive and/or because of a loss in tension in the paper ply that is caused during the adhesive application and/or marrying transformations.

As used herein, "paper product" refers to any formed, fibrous structure products, traditionally, but not necessarily, comprising cellulose fibers. In one embodiment, the paper products of the present invention include tissue-towel paper products.

As used herein, "ply" or "plies" means an individual fibrous structure or sheet of fibrous structure, optionally to be disposed in a substantially contiguous, face-to-face relationship with other plies, forming a multi-ply fibrous structure. It is also contemplated that a single fibrous structure can effectively form two “plies” or multiple “plies”, for example, by being folded on itself. In one embodiment, the ply has an end use as a tissue-towel paper product. A ply may comprise one or more wet-laid layers, air-laid layers, and/or combinations thereof. If more than one layer is used, it is not necessary for each layer to be made from the same fibrous structure. Further, the layers may or may not be homogenous within a layer. The actual makeup of a fibrous structure product ply is generally determined by the desired benefits of the final tissue-towel paper product, as would be known to one of skill in the art. The fibrous structure may comprise one or more plies of non-woven materials in addition to the wet-laid and/or air-laid plies.

As used herein, “fibrous structure” means an arrangement of fibers produced in any papermaking machine known in the art to create a ply of paper. “Fiber” means an elongate particulate having an apparent length greatly exceeding its apparent width. More specifically, and as used herein, fiber refers to such fibers suitable for a papermaking process. The present invention contemplates the use of a variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps, as well as mechanical pulps including, groundwood, thermomechanical pulp, chemically modified, and the like. Chemical pulps, however, may be preferred in tissue towel embodiments since they are known to those of skill in the art to impart a superior tactical sense of softness to tissue sheets made therefrom. Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981. Additionally, fibers derived from wood pulp such as cotton linters, bagesse, and the like, can be used. Additionally, fibers derived from recycled paper, which may contain any of all of the categories as well as other non-fibrous materials such as fillers and adhesives used to manufacture the original paper product may be used in the present web. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, polyethylene, and polypropylene fibers can be used within the scope of the present invention. Further, such fibers may be latex bonded. Other materials are also intended to be within the scope of the present invention as long as they do not interfere or counter act any advantage presented by the instant invention.

As used herein, “embossing” refers to the process of deflecting a relatively small portion of a cellulosic fibrous structure normal to its plane and impacting the projected portion of the fibrous structure against a relatively hard surface to permanently disrupt the fiber to fiber bonds.

Paper Product

The multi-ply tissue paper product of the present invention is equally applicable to all types of consumer paper products such as paper towels, toilet tissue, facial tissue, napkins, and the like. The present invention contemplates the use of a variety of paper making fibers, such as, natural fibers, synthetic fibers, as well as any other suitable fibers, starches, and combinations thereof. Paper making fibers useful in the present invention include cellulosic fibers commonly known as wood pulp fibers. Applicable wood pulps include chemical pulps, such as Kraft, sulfite and sulfate pulps, as well as mechanical pulps including, groundwood, thermomechanical pulp, chemically modified, and the like. Chemical pulps may be used in tissue towel embodiments since they are known to those of skill in the art to impart a superior tactical sense of softness to tissue sheets made there from. Pulps derived from deciduous trees (hardwood) and/or coniferous trees (softwood) can be utilized herein. Such hardwood and softwood fibers can be blended or deposited in layers to provide a stratified web. Exemplary layering embodiments and processes of layering are disclosed in U.S. Pat. Nos. 3,994,771 and 4,300,981. Additionally, fibers derived from wood pulp such as cotton linters, bagesse, and the like, can be used. Additionally, fibers derived from recycled paper, which may contain any of all of the categories as well as other non-fibrous materials such as fillers and adhesives used to manufacture the original paper product may be used in the present web. In addition, fibers and/or filaments made from polymers, specifically hydroxyl polymers, may be used in the present invention. Non-limiting examples of suitable hydroxyl polymers include polyvinyl alcohol, starch, starch derivatives, chitosan, chitosan derivatives, cellulose derivatives, gums, arabinans, galactans, and combinations thereof. Additionally, other synthetic fibers such as rayon, polyethylene, and polypropylene fibers can be used within the scope of the present invention. Further, such fibers may be latex bonded. Other materials are also intended to be within the scope of the present invention as long as they do not interfere or counteract any advantage presented by the instant invention.

The multi-ply tissue paper product of the present invention may comprise a tissue-towel paper product known in the industry. Embodiment of these substrates may be made according U.S. Pat. Nos. 4,191,609, 4,300,981, 4,191,609, 4,514,345, 4,528,239, 4,529,480, 4,637,859, 5,245,025, 5,275,700, 5,328,565, 5,334,289, 5,364,504, 5,527,428, 5,556,509, 5,628,876, 5,629,052, 5,637,194, and 5,411,636. The multi-ply tissue paper product substrate may be manufactured via a wet-laid making process where the resulting web may be comprised of fibrous structure selected from the group consisting of: through-air-dried fibrous structure plies, differential density fibrous structure plies, wet laid fibrous structure plies, air laid fibrous structure plies, conventional fibrous structure plies, and combinations thereof. Optionally, the cellulosic fibrous structure substrate may be foreshortened by creping or by wet microcontraction. Creping and/or wet microcontraction are disclosed in U.S. Pat. Nos. 6,048,938, 5,942,085, 5,865,950, 4,440,597, 4,191,756, and 6,187,138.

Multi-Ply Paper Products

Multi-ply paper products are well known in the art. Producers and consumers of paper products generally favor multi-ply paper products over single-ply paper products because it is thought that a multiple ply structure can have an absorbent capacity greater than the sum of the absorbent capacities of the individual single plies which make up the multiple ply structure. Without wishing to be limited by theory, it is thought that this difference is due, at least in part, to the inter-ply storage space created by the addition of an extra paper web or ply. Examples of multiple ply paper structures are shown in the following references: U.S. Pat. Nos. 3,414,459, 3,549,723, 3,556,907, 3,650,882, 3,708,366, 3,738,905, 3,867,225, 3,953,638, 4,300,981, 4,483,728, 4,469,735, 5,468,323, and 5,490,902.

Converting System: Embossing Roll

An embossing roll that may be used in the present invention comprises a plurality of emboss protrusions. The emboss protrusions, also referred to by those of skill in the art as emboss knobs, of the embossing roll that are used in the embossing/converting process are very important. Rubber to steel embossing is exemplified supra. Without being limited by theory it is thought that the surface area and shape of the surface of each emboss knob (sometimes referred to by those of skill in the art as "emboss protrusion") may be important to the product that is output as the surface area and shape of each emboss knob affects the force pressure to the surface of the web as well as the distribution of the pressure on the surface of the web. However, any shape/size of emboss protrusion may be used in the present invention apparatus and process.

Exemplary embossing rolls are described in U.S. Pat. No. 5,036,758. Alternatively, an embossing roll may be purchased from a vendor such as Northern Engraving (Green Bay, Wis.), Standex Engraving (Richmond, Va.), or Eastern Engraving (Stirling, N.J.).

Converting System: Pressure Roll

A pressure roll that may be used in the present invention may comprise a solid core and an elastomeric roll cover for accepting the protrusions of the emboss roll. Both natural rubbers and synthetic elastomers have been used in pressure roll covers. It also is known to use a plurality of different materials in layers between the roll shell and the top layer of the roll cover, as transition layers between the shell and the top layer, to promote roll cover life. Examples of roll covers are described in U.S. Pat. Nos. 5,887,517, 6,173,496, 6,874,232, and 7,008,513. Suitable roll covers may be purchased from a commercial vendor such as Xerium Technologies, Inc/Stowe Woodward (Youngsville, N.C.), Valley Roller Company, Inc. (Appleton, Wis.), American Roller Co. (Union Grove, Wis.).

Alternatively, the converting roll comprising an elastomeric roll cover disposed upon a core (or some base layer) may be purchased from a vendor such as Xerium Technologies, Inc/Stowe Woodward (Youngsville, N.C.), Valley Roller Company, Inc. (Appleton, Wis.), American Roller Co. (Union Grove, Wis.).

Converting System: Marrying Roll

It is well known in the art that it is possible to produce a multi-ply embossed paper product. Alternatively, it is well known in the art to use adhesives to bond two or more paper webs together. For example, the embossments on the surface of a first paper web may have adhesive applied thereto and a second paper web may be aligned in a face-to-face orientation with the adhesive-covered embossments of the first ply. To bond the two plies together, a marrying roll (which may comprise a steel roll having an elastomeric cover) may be juxtaposed in an axially parallel relationship with the roll on which the paper webs are traveling (for example, an embossing roll) which allows for a nip to be formed between the embossing roll and the marrying roll, thus allowing for the two or more plies to be combined at this nip. Exemplary embodiment of the process and apparatus for using a marrying roll is described in U.S. Pat. Nos. 3,867,225 and 4,483,728.

It is possible to marry two or more paper webs without the use of adhesive. For example, two or more paper webs may be combined by providing a high degree of pressure to the paper webs between two steel embossing rolls. Alternatively, it is known by those of skill in the art that the use of a marrying roll that has a hard surface, rather than a marrying roll that has an elastomeric cover, may be used to bond two or more paper webs together. Such a marrying roll is sometimes referred to in the art as an "anvil roll." In an exemplary process wherein two paper webs are married together without adhesive, a load of greater than about 120 pli (with a 3% bond area) may be applied by the marrying roll (having no elastomeric cover) and the embossing roll. In one embodiment, a load of from about 100 pli to about 900 pli may be used in a non-adhesive bonding process. In one embodiment, a bond area of from about 2% to about 25% may be used in a non-adhesive bonding process. Other exemplary processes disclosing non-adhesive bonding to two or more paper webs are described in U.S. Pat. Nos. 6,086,715 and U.S. Pat. No. 6,395,133.

Suitable marrying rolls may be purchased from a vendor such as Xerium Technologies, Inc/Stowe Woodward (Youngsville, N.C.), Valley Roller Company, Inc. (Appleton, Wis.), American Roller Co. (Union Grove, Wis.).

Converting System: Present Invention Apparatus and Process for Use

FIG. 1A illustrates, in schematic form, a nonlimiting exemplary process and apparatus 10 of the present invention. The apparatus 10 comprises an embossing roll 12, a first pressure roll 14, a second pressure roll 16, an adhesive application roll 18, and a marrying roll 19. In one embodiment the embossing roll 12 is steel. In some embodiments, the first pressure roll 14 and the emboss roll 12 are juxtaposed in an axially parallel relationship to form a first nip 31 therebetween. The first pressure roll 14 and emboss roll 12 are adapted to receive a first paper web 22 interposed therebetween at the first nip 31. The marrying roll 19 and embossing roll 12 are juxtaposed in an axially parallel relationship with the embossing roll 12 and marrying roll 19 forming a second nip 34 therebetween, the marrying roll 19 and embossing roll 12 being adapted to receive one or more paper webs interposed therebetween at the second nip 34. The second pressure roll 16 and the embossing roll 12 are juxtaposed in an axially parallel relationship to form a third nip 33 therebetween. The second pressure roll 16 and the embossing roll 12 are adapted to receive the one or more paper webs at the therebetween at the third nip 33.

In some embodiments comprising an adhesive application roll 18, the adhesive application roll 18 and embossing roll 12 are juxtaposed in an axially parallel relationship such that there is a small gap 32 between the distal end of the of the embossing protrusions 52 and the adhesive application roll 18. In one embodiment, the gap 32 is from about 0.001" to about 0.02". In another embodiment, the gap is from about 0.002" to about 0.01". Adhesive (from the adhesive application roll) may be applied onto portions of a paper web that have been embossed by the first pressure roll 14 and the embossing roll 12 as the paper web passes through or gap 32.

In an exemplary embodiment of the present invention, a first paper web 22 passes between the first pressure roll 14 and the emboss roll 12 at the first nip 31. In one embodiment, adhesive is applied to the raised embossments on the surface of the first paper web 22 at the gap 32, using an adhesive application roll 18 after the first paper web 22 traverses the first nip 31. A second paper web 24 is joined to the first paper web 22 between the embossing roll 12 and marrying roll 19 at the second nip 34 after the first paper web traverses the gap 32. After passing through the second nip 34, the resultant multi-ply paper product 26 is then embossed between a second rubber roll 16 and the emboss roll 12 at the third nip 33. In one embodiment, the second ply is embossed before it is married to the first ply. In embodiments wherein the second ply is embossed, the embossing pattern of the second ply may be the same or different from the embossing pattern of the first ply.

In another embodiment, the second ply is unembossed before it is married to the first ply. It is surprisingly found that by providing a relatively light first embossing transformation, the first web 22 maintains a relatively high level of tension so as to avoid the first web 22 from being lifted off from the embossing roll 12 when the adhesive application roll 18 applies adhesive to the first web 22. As described supra, because there is either no, or a relatively low, amount of shifting of the web, then there cannot be any misregistration because the web is in the desired configuration as it passes through the second embossing transformation as the web passes between the second pressure roll 16 and the embossing roll 12. As a result, paper products made by the instant invention apparatus and method surprisingly exhibit a highly pronounced and clear embossment in a final product in which the adhesive application, embossing, and marrying transformations are registered.

Figure 1B:
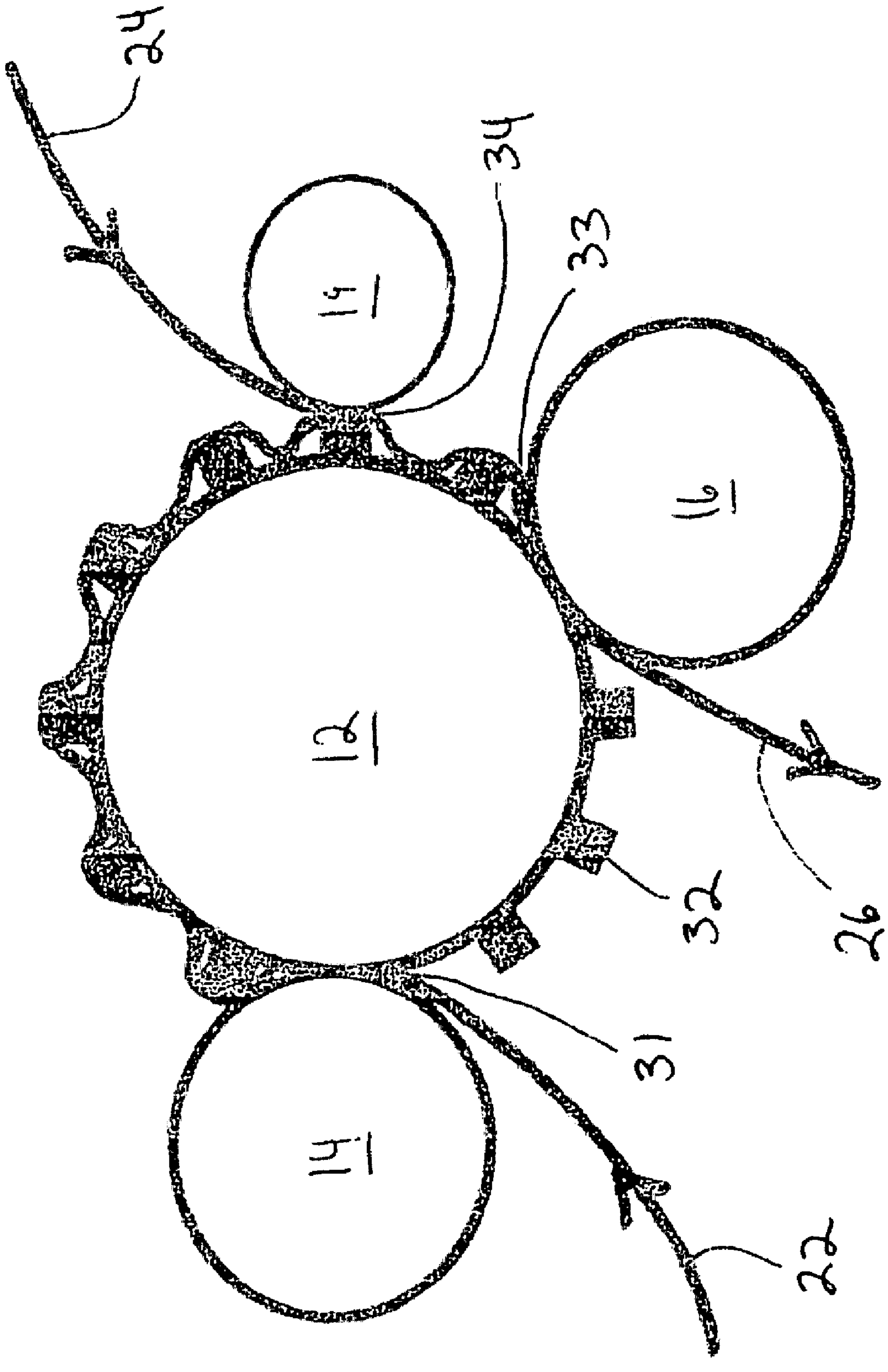
FIG. 1B is a schematic side view of an alternative embodiment of an exemplary apparatus of the present invention.

FIG. 1B illustrates in schematic form an alternative embodiment of the process and apparatus 10 of the present invention. The apparatus 10 is identical to the embodiment shown in FIG. 1A, except that there is no adhesive application roll 18 and wherein the marrying roll 19 provides a load that is suitable to bond the paper plies 22, 24 at the point where the marrying roll 19 and the embossing roll 12 contact each other. One of skill in the art will appreciate that in embodiments of the present invention wherein the two or more paper webs are bonded without adhesive, there will not be a nip formed between the marrying roll 19 and the embossing roll 12, thus there will only be a first nip and second nip formed between the first pressure roll 14 and embossing roll 12 and the second pressure roll 16 embossing roll 12, respectively.

In the present invention process/apparatus, one non-limiting means of providing different levels of embossing to the multi-ply paper product is to use pressure rolls having different hardness ratings and/or to provide different nip widths between the pressure rolls 14, 16 and embossing roll 12. In one embodiment, the pressure rolls 14, 16 have a hardness of from about 90 P&J to about 150 P&J. In another embodiment, the pressure rolls 14, 16 have a hardness of from about 105 P&J to about 125 P&J.

As discussed supra, after the first embossing stage, the first ply 22 may continue to have adhesive applied thereto and the first paper web 22 and a second paper web 24 may undergo a second embossing transformation after the first paper web 22 is married to the second paper web 24 to provide a resultant multi-ply paper product 26. It is thought that by providing a relatively low level of embossing at the first pressure roll 12, and a second embossing stage that compliments the first embossing stage, there will be a relatively high level of tension in the paper webs 22, 24 as compared to a prior art embossing process. Thus, because of the relatively high tension in the web, both the first paper web 22 and second paper web 24 are registered at the marrying roll 19, thus providing a resultant multi-ply paper product 26 in which the embossing, adhesive application, and/or marrying transformations may be registered relative to one another. Further, a relatively high level of embossing may be performed by the second pressure roll 16 because any losses in tension caused by a high level of embossing at the second pressure roll 16 would not cause misregistration in the final product since there are no additional converting transformations downstream.

Without wishing to be limited by theory, it is thought that by providing a first level of embossing which is relatively light compared to a typical prior art embossing process of the prior art, the first paper web 22 will not suffer from a loss in tension, thereby preventing, or in some cases eliminating altogether, any shifting of the first paper web 22 that the adhesive application step may cause.

One of skill in the art will appreciate that, without being limited by theory, the level of embossing is highly dependent on the nip width formed between rolls, the material used in the pressure roll cover, and additional factors. It is known to those of skill in the art that the relationship between nip width, load, roll dimensions, and rubber properties may be approximated using the following relationship:

$$W_N = \left[\frac{5.8\times10^{-6} LTD_1D_2P^{1.35}}{D_1+D_2}\right]^{0.81(D_1)^{-0.232}}$$

Where:

$D_1$ is the converting roll diameter in units of inches $D_2$ is the embossing roll diameter in units of inches L is the nip load in units of pounds per linear inch (PLI)

T is the thickness of the roll cover in units of inches

P is the rubber hardness in units of P&J $W_N$ is the nip width in units of inches In the examples of the present invention, the following non-limiting an embossing roll 12 having a diameter of about 18", and the pressure rolls 14, 16 have a diameter of 14" where the pressure rolls have a roll cover of 0.75" in thickness with a hardness of about 100 P&J. In the exemplary non-limiting embossing roll 12, the load is about 155 pli. However, one of skill in the art will appreciate that the load between the pressure roll and embossing roll may be from about 70 pli to about 150 pli. The exemplary embossing roll and pressure roll provides a nip width of about 1.75" (about 4.445 cm). It may be observed that, using the same rolls and configuration, and providing a nip width of greater than 1.75, the paper web suffers from a loss in tension, thus causing the resultant converting transformations to become misregistered.

In one embodiment, the width of the first nip 31 (between the embossing roll 12 and the first pressure roll 14) is from about 1" to about 1.75". In another embodiment, the width of the first nip is from about 1.25" to about 1.65". In one embodiment, the width of the second nip 33 (between the embossing roll 12 and the second pressure roll 16) is from about 0.75" to about 2.50". In another embodiment, the width of the second nip is from about 1.25" to about 2.25". In some embodiments, the width of the first nip 31 is smaller than the width of the second nip 33. In other embodiments, the width of the first nip 31 is larger than the width of the second nip 33. In other embodiments still, the width of the first nip 31 is about the same size as the width of the second nip 33.

Figure 2A:
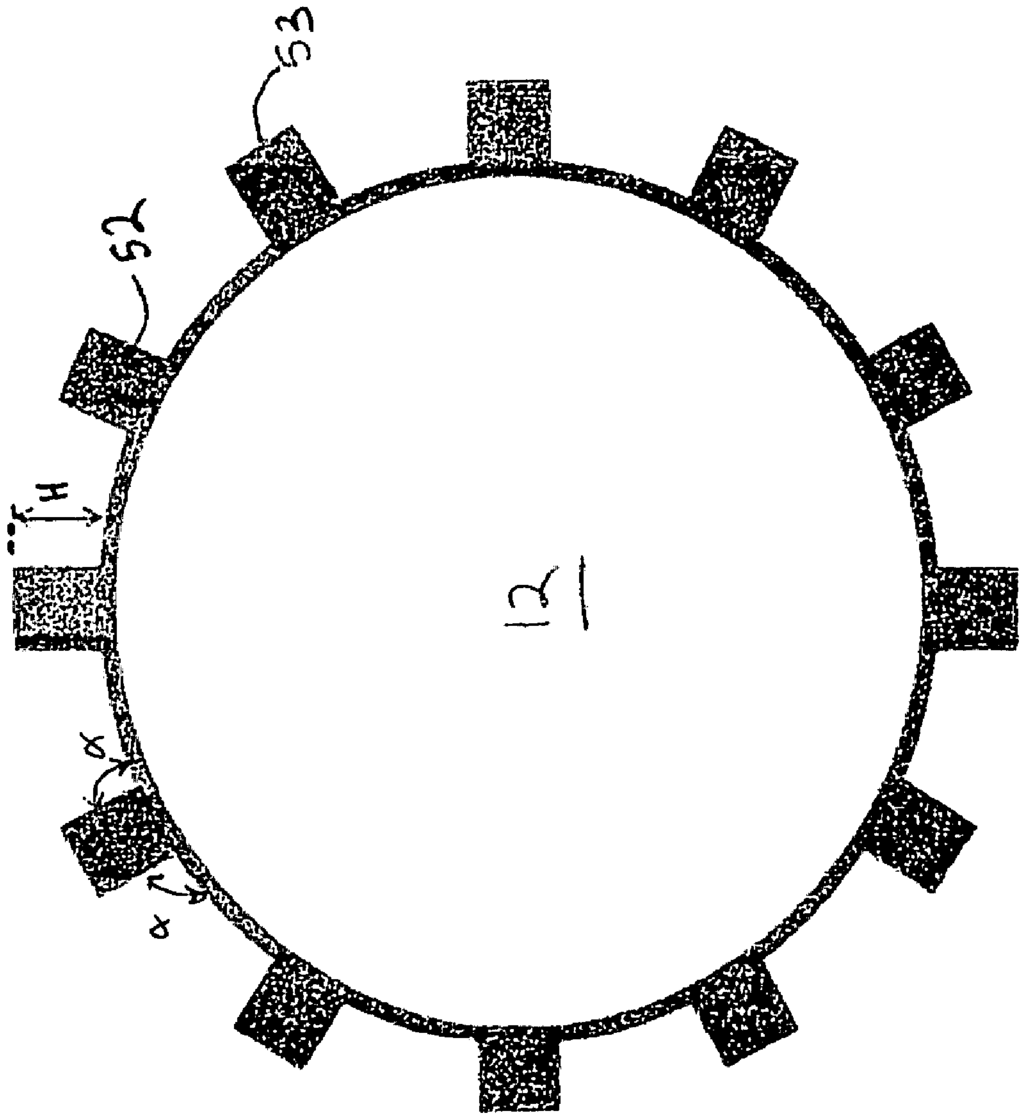
FIG. 2A is a schematic side view of an exemplary embodiment of an embossing roll which may be used in the present invention apparatus.

FIG. 2A illustrates an enlarged partial view of the embossing roll 12 shown in FIG. 1. In one embodiment, the embossing roll 12 comprises a plurality of embossing protrusions 52 that may be randomly, or non-randomly, configured. Each embossing protrusion 52 has a distal end 53. The embossing roll 12 may made to any diameter that may suit the desired process. In some embodiments of the present invention, the embossing roll 12 has a diameter of from about 10" to about 30". In other embodiments, the embossing roll 12 has a diameter of from about 16" to about 26". In one embodiment, the embossing protrusions 52 have a height H of from about 0.05" to about 0.180". In another embodiment, the embossing protrusions 52 have a height of from about 0.070" to about 0.150". In one embodiment, the emboss protrusions 52 are directed directly perpendicular from the surface of the embossing roll 12, that is, in one embodiment, the embossing protrusions 52 have a wall angle α of about 90°. In another embodiment, the embossing protrusions 52 have a wall angle a of from about 80° to about 60°.

Figure 2B:
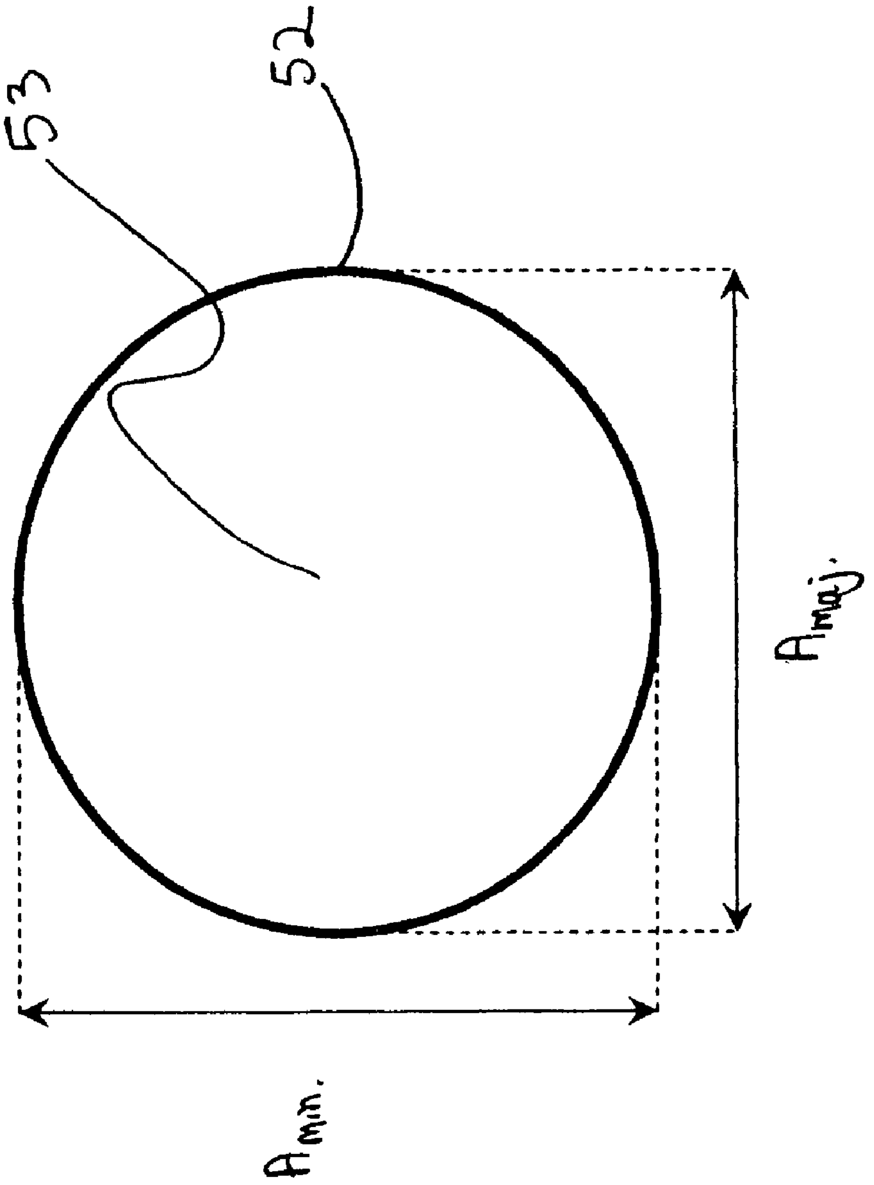
FIG. 2B is a top view of an exemplary embodiment of an embossing protrusion of the embossing roll of FIG. 2A.

FIG. 2B illustrates an enlarged top view of an exemplary individual embossment. The embossing protrusions 52 may be any shape that is suitable for the desired application. In one embodiment, the surface of the embossing protrusions 52 are round. In another embodiment, the surface of the embossing protrusions 52 are oblong. In one embodiment, the embossing protrusions 52 have a major axis $A_{maj}$ and a minor axis $A_{min}$. In one embodiment, the major axis and/or minor axis is of from about 0.020" to about 0.200". In some embodiments, the minor axis is from about 0.1X to about 0.8X the size of the major axis. In other embodiments, the minor axis is from about 0.3X to about 0.6X the size of the major axis.

In one embodiment, the there are from about 1 to about 150 embossing protrusions 52 per square inch. In another embodiment, there are from about 8 to about 100 embossing protrusions 52 per square inch. In another embodiment, there are from about 10 to about 25 embossing protrusions 52 per square inch. In one embodiment, the emboss protrusions occupy from about 4% to about 50% of the surface of the emboss roll 12. In another embodiment, the embossing protrusions occupy from about 6% to about 16% of the surface of the emboss roll 12.

Figure 3:
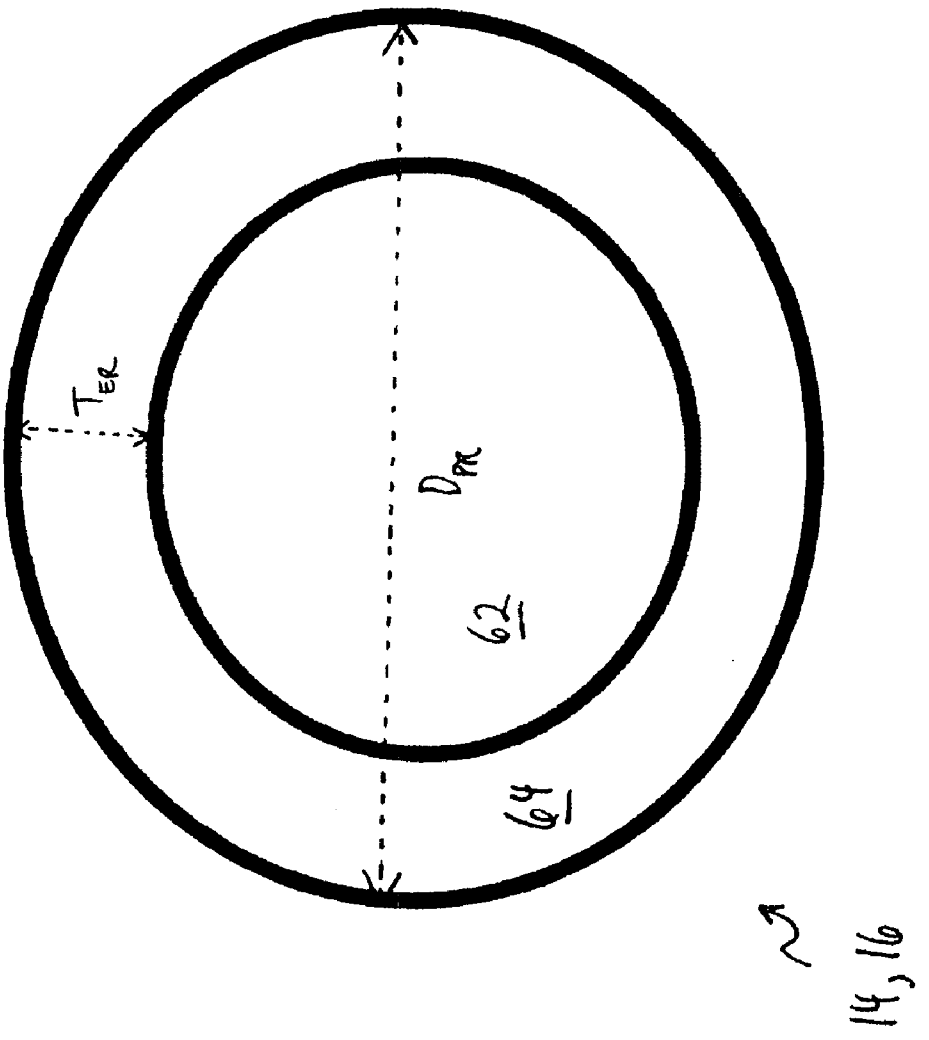
FIG. 3 is a schematic side view of an exemplary embodiment of a pressure roll which may be used in the present invention apparatus.

FIG. 3 illustrates an enlarged partial view of a pressure roll which may be used as either the first pressure roll 14 or second pressure roll 16 shown in FIG. 1. In one embodiment, a pressure roll may have a diameter DPR of from about 10" to about 25". In another embodiment, the first pressure roll 14 may have a diameter of from about 15" to about 20". In some embodiments, the pressure roll comprises a solid core 62 and an elastomeric roll cover 64 for accepting the embossing protrusions 52 of an adjacent emboss roll 12 (shown in FIG. 1). In embodiments wherein a pressure roll 14, 16 comprises an elastomeric roll cover, the elastomeric roll cover 64 may have a thickness $T_{ER}$ of from about 0.75" to about 1.25". In some embodiments, the first pressure roll 14 and second pressure roll 16 have the same dimensions. In other embodiments, the first pressure roll 14 and second pressure roll 16 have different dimensions.

In one embodiment, the present invention apparatus/process converts paper at a constant sheet velocity. In some non-limiting embodiments, the sheet velocity is from about 1000 fpm to about 3000 fpm.

EXAMPLE

Resultant Paper Product

One fibrous structure useful in achieving the embossed multi-ply paper product of the present invention is the through-air-dried (TAD), differential density structure described in U.S. Pat. No. 4,528,239. Such a product may be formed by the following process.

A Fourdrinier, through-air-dried papermaking machine is used. A slurry of papermaking fibers is pumped to the headbox at a consistency of about 0.15%. The slurry consists of about 70% Northern Softwood Kraft fibers, about 30% unrefined Eucalyptus fibers, a cationic polyamine-epichlorohydrin wet burst strength resin at a concentration of about 25 lbs per ton of dry fiber, and carboxymethyl cellulose at a concentration of about 5 lbs per ton of dry fiber, as well as DTDMAMS at a concentration of about 6 lbs per ton of dry fiber.

Dewatering occurs through the Fourdrinier wire and is assisted by vacuum boxes. The embryonic wet web is transferred from the Fourdrinier wire at a fiber consistency of about 20% at the point of transfer, to a TAD carrier fabric. The wire speed is about 620 feet per minute. The carrier fabric speed is about 600 feet per minute. Since the wire speed is faster than the carrier fabric, wet shortening of the web occurs at the transfer point. Thus, the wet web foreshortening is about 3%.

The consistency of the web is about 60% after the action of the TAD dryers operating about a 400° F., before transfer onto the Yankee dryer. An aqueous solution of creping adhesive is applied to the Yankee surface by spray applicators before the location of the sheet transfer. The fiber consistency is increased to an estimated 95.5% before creping the web with a doctor blade. The doctor blade has a bevel angle of about 25 degrees and is positioned with respect to the Yankee dryer to provide an impact angle of about 81 degrees. The Yankee dryer is operated at about 360° F., and Yankee hoods are operated at about 350° F.

The dry, creped paper web is passed between two calendar rolls and rolled on a reel operated at 560 feet per minute so that there is about 7% foreshortening of the web by crepe.

The paper web described above is then subjected to a knob-to-rubber impression embossing apparatus and process as follows: An embossing roll is engraved with a nonrandom pattern of embossing protrusions. The embossing protrusions have a wall angle of 90°, round surface with a major/minor axis of 0.1", and a height of 0.1". There are 20 embossing protrusions per square inch.

The paper web passes a 1.5" nip formed between the embossing roll and a first pressure roll having a hardness of about 100 P&J that is juxtaposed in an axially parallel arrangement with the embossing roll. After undergoing an initial embossing transformation, the paper web passes a nip formed between the embossing roll and an adhesive application roll that is juxtaposed in an axially parallel arrangement with the embossing roll such that the adhesive application roll contacts the distal end of the embossing protrusions, and therefore adhesive is only applied to the embossed areas of the paper web. Once adhesive has been applied to the embossed areas, the paper web then passes between a nip formed between the embossing roll and a marrying roll, which marries the paper web to a different paper web, which is also as described above, and is also passed through the nip formed between the embossing roll and the marrying roll. The resultant multi-ply paper product is passed through a 1.75" nip formed between the embossing roll and a second pressure roll having a hardness of about 105 P&J that is juxtaposed in an axially parallel arrangement with the embossing roll. The above converting operations are carried out at a constant sheet velocity of about 1000 fpm.

Surprisingly, the resultant embossed multi-ply paper product has a more pronounced emboss pattern than products of the prior art. In addition, the resultant embossed multi-ply paper product exhibits registration which is greatly improved over that produced by prior art embossing processes.

All documents cited in the Detailed Description of the Invention are, in relevant part, incorporated herein by reference; the citation of any document is not to be construed as an admission that it is prior art with respect to the present invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for manufacturing a multi-ply web material, the process comprising the steps of:

a) providing an embossing roll having first, second, and third nips disposed about a periphery thereof;

b) providing a first web material;

c) embossing the first web material in the first nip to produce an embossed first web material having embossed portions associated therewith;

d) after step d, applying an adhesive to the embossed first web material;

e) joining the embossed first web material to a second web material at the second nip so that portions of the embossed first web material are contactingly engaged with portions of the embossed second web material; and, f) further embossing both the embossed first web material and the second web material at the third nip with an elastomeric covered roll.

2. The process for manufacturing a multi-ply web material according to claim 1, further comprising the step of providing the embossing roll with a plurality of protrusions, the protrusions corresponding to the embossed portions of the embossed first web material.

3. The process for manufacturing a multi-ply web material according to claim 1, further comprising the step of providing the first nip with a first nip width, $W_N$, the first nip width being determined by the equation:

$$W_N = \left[\frac{5.8\times10^{-6}LTD_1D_2P^{1.35}}{D_1+D_2}\right]^{0.81(D_1)^{-0.232}}$$

Where:

$D_1$ is the converting roll diameter in units of inches $D_2$ is the embossing roll diameter in units of inches L is the nip load in units of pounds per linear inch (PLI)

T is the thickness of the roll cover in units of inches

P is the rubber hardness in units of P&J $W_N$ is the nip width in units of inches.

4. The process for manufacturing a multi-ply web material according to claim 3, further comprising the step of providing the first nip width less than the third nip width.

5. The process for manufacturing a multi-ply web material according to claim 1, further comprising the step of providing the first nip width ranging from about 1 inch to about 1.75 inches.

6. The process for manufacturing a multi-ply web material according to claim 5, further comprising the step of providing the first nip width ranging from about 1.25 inches to about 1.65 inches.

7. The process for manufacturing a multi-ply web material according to claim 6, further comprising the step of providing the third nip with a third nip width ranging from about 0.75 inches to about 2.50 inches.

8. The process for manufacturing a multi-ply web material according to claim 7, further comprising the step of providing the third nip width ranging from about 1.25 inches to about 2.25 inches.

9. The process for manufacturing a multi-ply web material according to claim 1, further comprising the step of providing the first nip with a nip pressure ranging from about 70 pli to about 150 pli.

10. A process for manufacturing a multi-ply web material, the process comprising the steps of:

a) providing an embossing roll having first, second, and third nips disposed about a periphery thereof;

b) providing a first web material;

c) embossing the first web material in said first nip to produce an embossed first web material having embossed portions associated therewith;

d) after step c, applying an adhesive to at least some of the embossed portions of the embossed first web material;

e) joining the embossed first web material to a second web material in a face-to-face relationship in said second nip so that the embossed portions of the embossed first web material are contactingly engaged with corresponding portions of the second web material; and, f) embossing both the embossed first web material and the second web material in said third nip using an elastomeric coverecd roll to produce the embossed multi-ply web material.

11. The process for manufacturing a multi-ply web material according to claim 10, further comprising the step of providing the embossing roll with a plurality of protrusions, the protrusions corresponding to the embossed portions of the embossed first web material.

12. The process for manufacturing a multi-ply web material according to claim 10, further comprising the step of providing the first nip with a first nip width, $W_N$, the first nip width being determined by the equation:

$$W_N = \left[\frac{5.8\times10^{-6}LTD_1D_2P^{1.35}}{D_1+D_2}\right]^{0.81(D_1)^{-0.232}}$$

Where:

$D_1$ is the converting roll diameter in units of inches $D_2$ is the embossing roll diameter in units of inches L is the nip load in units of pounds per linear inch (PLI)

T is the thickness of the roll cover in units of inches

P is the rubber hardness in units of P&J $W_N$ is the nip width in units of inches.

13. The process for manufacturing a multi-ply web material according to claim 12, further comprising the step of providing the first nip width less than the third nip width.

14. The process for manufacturing a multi-ply web material according to claim 10, further comprising the step of providing the first nip width ranging from about 1 inch to about 1.75 inches.

15. The process for manufacturing a multi-ply web material according to claim 14, further comprising the step of providing the first nip width ranging from about 1.25 inches to about 1.65 inches.

16. The process for manufacturing a multi-ply web material according to claim 15, further comprising the step of providing the third nip with a third nip width ranging from about 0.75 inches to about 2.50 inches.

17. The process for manufacturing a multi-ply web material according to claim 10, further comprising the step of providing the first nip with a nip pressure ranging from about 70 pli to about 150 pli.

18. The process for manufacturing a multi-ply web material according to claim 10, further comprising the step of providing the first nip with a nip pressure of about 155 pli.

* * * * *